United States Patent
Iida et al.

(10) Patent No.: US 6,497,301 B2
(45) Date of Patent: Dec. 24, 2002

(54) FRONT/REAR WHEEL TORQUE DISTRIBUTION CONTROL APPARATUS FOR FOUR WHEEL DRIVE VEHICLE

(75) Inventors: Norio Iida, Kanagawa-ken (JP); Yoshiyuki Fukuda, Kanagawa-ken (JP); Hirotaka Kusukawa, Tokyo (JP); Atsuhiko Gotou, Kanagawa-ken (JP); Satoshi Mizuya, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/954,048

(22) Filed: Sep. 18, 2001

(65) Prior Publication Data

US 2002/0033291 A1 Mar. 21, 2002

(30) Foreign Application Priority Data

Sep. 19, 2000 (JP) ........................................ 2000-282895

(51) Int. Cl.[7] .............................................. B60K 17/35
(52) U.S. Cl. .............................. 180/249; 701/69; 701/87
(58) Field of Search ................................. 180/233, 248, 180/249, 250, 197; 701/69, 88, 89, 74, 87

(56) References Cited

FOREIGN PATENT DOCUMENTS

JP            04-103433            4/1992

*Primary Examiner*—Avraham Lerner
(74) *Attorney, Agent, or Firm*—Foley & Lardner

(57) ABSTRACT

To achieve a first object of the present invention, a starting time limit vehicle speed which preferentially permits a torque distribution to front and rear wheels at the time of starting of a vehicle is switched in accordance with a degree of a diameter difference. To achieve a second object of the present invention, when the vehicle makes a normal running with different-diameter tires mounted thereon, a front/rear wheel distribution torque caused by a front/rear wheel rotation speed difference owing to the different-diameter tires is limited by switching a torque gain depending on a degree of a diameter difference.

7 Claims, 10 Drawing Sheets

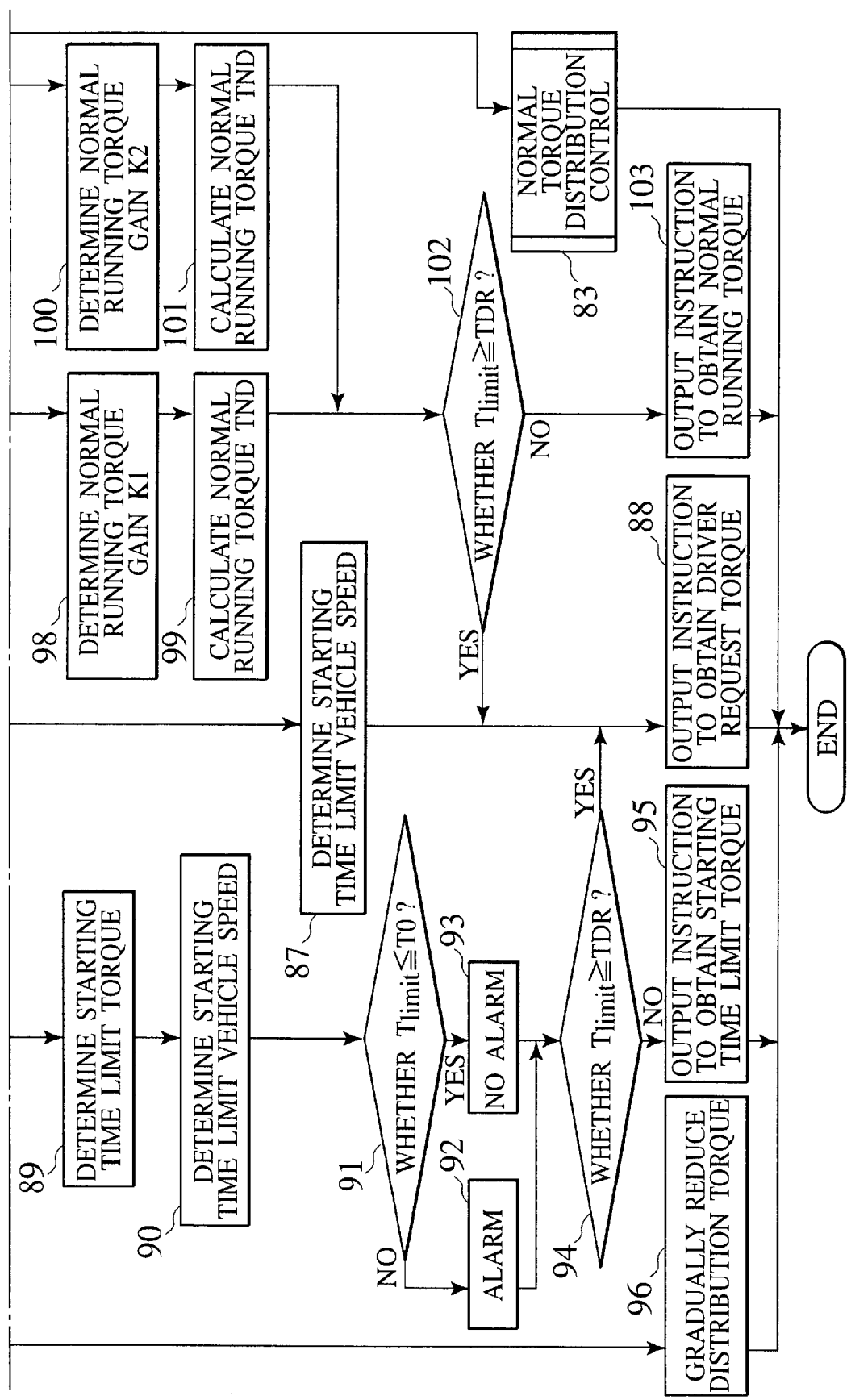

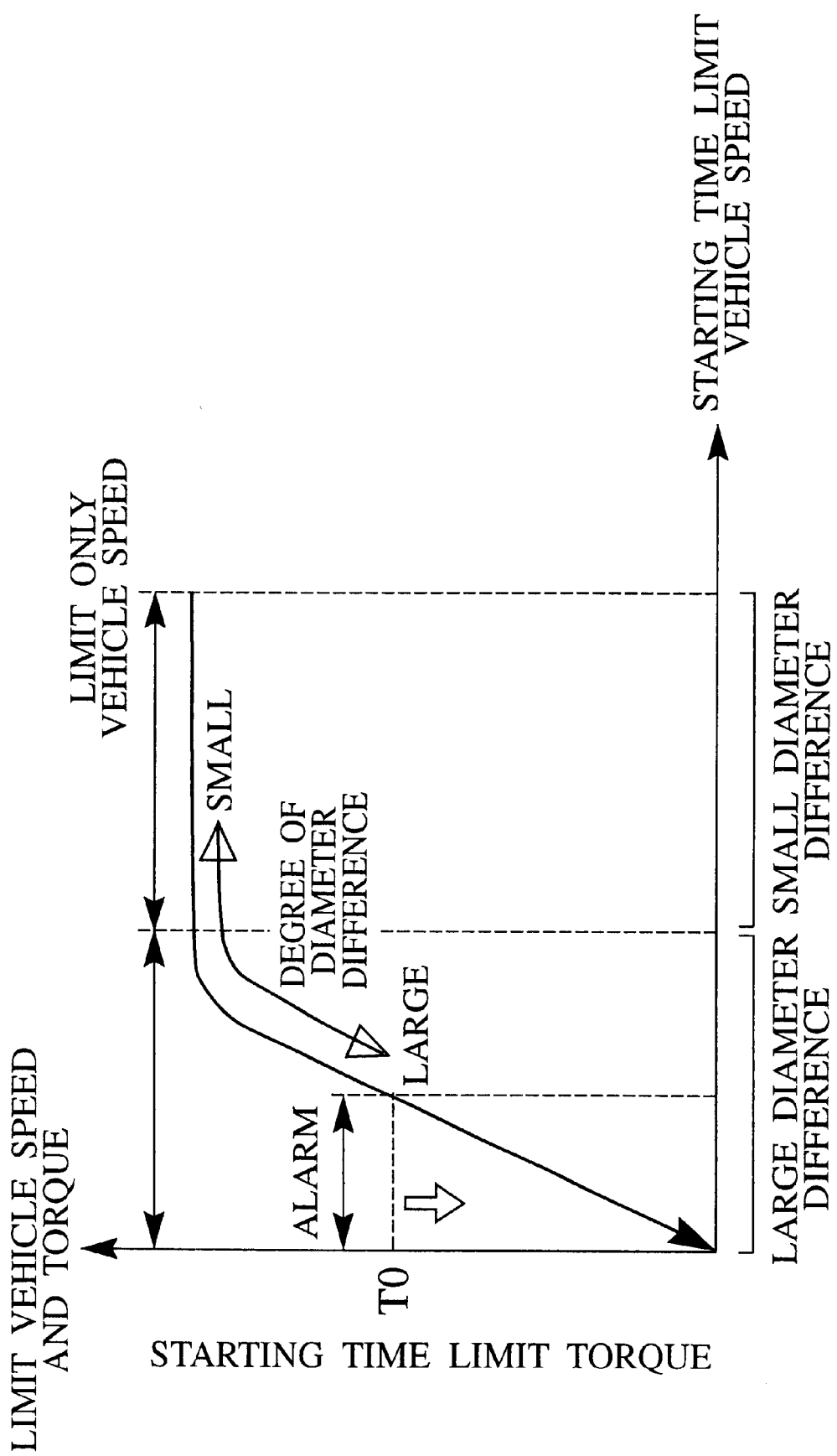

FRONT/REAR WHEEL TORQUE DISTRIBUTION CONTROL APPARATUS FOR FOUR WHEEL DRIVE VEHICLE

BACKGROUND OF THE INVENTION

1. Field of the Invention

The present invention relates to a front/rear wheel torque distribution control apparatus applied to a four-wheel drive vehicle, which variably controls a driving torque distribution to a front wheel and a rear wheel by controlling a tightening torque of an electronic control clutch.

2. Description of the Related Art

A technology has been heretofore known, in which in the case where a four-wheel drive vehicle having an electronic control clutch for controlling a torque distribution transmitted to front and rear wheels is mounted with a tire having a diameter different from that of a tire originally mounted thereon (hereinafter the tire having the diameter different from that of the tire originally mounted is referred to as a different-diameter tire, and the tire originally mounted is a normal-diameter tire), after the different-diameter tires are detected, a front/rear wheel distributed torque is not controlled (an alarm alone is raised) or the front/rear distributed torque is made close to a two-wheel drive side (see Japanese Patent Application Laid-Open No. 4(1992)-103433).

SUMMARY OF THE INVENTION

However, the conventional front/rear wheel torque distribution control apparatus of the four-wheel drive vehicle has the following problems.

When the distribution torque is large despite of an increase of a vehicle speed (a clutch tightening state), a difference of a rotation speed between the front wheel and the rear wheel, which is produced by the different-diameter tires, cannot be absorbed by a relative rotation of a plate of the electronic control clutch. A drive train may be adversely affected as long as a driver does not cope with such a situation with replacement of the tire with new one and the like.

When the torque distribution is made to be a sufficiently small constant value (two-wheel drive side), four-wheel drive performance in which a good starting characteristic is to be obtained in starting a vehicle is deteriorated.

The first object of the present invention is to provide a front/rear wheel torque distribution control apparatus of a four-wheel drive vehicle capable of reducing bad influence of different-diameter tires on a drive train without damaging inherent four-wheel drive performance enhancing a starting property at the time of a start of the vehicle at which large front/rear wheel distribution torque is required.

The second object of the present invention is to provide a front/rear wheel torque distribution control apparatus of a four-wheel vehicle capable of securing the lowest four-wheel drive performance in a normal running state of a vehicle by allowing a front/rear wheel distribution torque to approach to a torque at the time normal tires are mounted thereon.

To achieve the first object of the present invention, a first aspect of the present invention provides a front/rear wheel torque distribution control apparatus of a four-wheel drive vehicle having an electronic control clutch for controlling a torque distribution to front and rear wheels, in which one of the front and rear wheels is a main drive wheel and the other is a subsidiary drive wheel, the front/rear wheel torque distribution control apparatus comprising:

a tire diameter difference degree detector for detecting a degree of a diameter difference between a different-diameter tire and a normal-diameter tire (hereinafter referred to as a degree of a diameter difference) when any of the front and rear wheels mounts the different-diameter tires;

a driver request torque calculator for calculating a driver request torque transmitted from the main drive wheel to the subsidiary drive wheel via the electronic control clutch in response to an operation of a driver;

a vehicle speed detector for detecting a vehicle speed;

a starting time limit speed determiner for making a starting time limit speed in which a torque at the time of starting the vehicle is limited by a vehicle speed lower as the degree of the tire diameter difference detected by the tire diameter difference degree detector is larger; and a starting time torque distribution controller for outputting an instruction to obtain the driver request torque calculated by the driver request torque calculator to the electronic control clutch until the vehicle speed becomes equal to a starting time limit vehicle speed determined by the starting time limit speed determiner when the vehicle mounts the different-diameter tires.

In the first aspect of the present invention, the tire diameter difference degree detector detects the degree of the diameter difference when the vehicle mounts the different-diameter tires on any of the front and rear wheels. In response to the operation of the driver, the driver request torque calculator calculates the driver request torque transmitted via the electronic control clutch. The vehicle speed detector detects the vehicle speed.

When the detected degree of the tire diameter difference is higher than a setting value, the starting time limit speed determiner determines the limit torque so as to be smaller as the degree of the diameter difference is lager.

When the vehicle mounted with the different-diameter tires starts, the starting time torque distribution controller outputs an instruction to obtain the driver request torque calculated by the driver request torque calculator to the electronic control clutch until the detected vehicle speed becomes equal to the starting time limit vehicle speed. The torque distribution transmitted to the front and rear wheels is control to a four-wheel drive side.

Specifically, at the time of starting of the vehicle when the front/rear wheel rotation speed difference occurs due to a large drive slip, a distribution of the drive torque to the four wheels as evenly as possible and acquisition of a starting property suppressing the drive slip are wished. However, when a torque distribution control is performed for the vehicle mounted with the different-diameter tire just in the same manner for the vehicle mounted with the normal-diameter tire and a perfect clutch tightening state is maintained because of a large front/rear wheel distribution torque in spite of an increased vehicle speed, the front/rear wheel rotation speed difference caused by the different-diameter tire cannot be absorbed by the electronic control clutch, and a twist torque occurs in a drive train (drive system). Furthermore, when a clutch tightening force is not sufficiently high, the front/rear wheel rotation speed difference caused by the different-diameter tire can be absorbed by a relative rotation of a clutch plate. However, a high friction heat is generated because of the relative rotation in the state where the clutch tightening force is applied, so that deterioration of the clutch due to heat is promoted. In any case, if a driver does not cope with such a situation by some countermeasures such as replacement of the tire with new one, a drive train including the electronic control clutch is adversely affected.

On the other hand, when the torque distribution to the front and rear wheels is made to be close to a two-wheel drive side in starting of the vehicle mounted with the different-diameter tires, the adverse influence on the drive train is removed. However, a high starting property utilizing a four-wheel drive performance cannot be obtained at the time of starting of the vehicle.

Accordingly, a vehicle speed (starting time limit vehicle speed) which preferentially permits the torque distribution to the front and rear wheels at the time of starting of the vehicle is switched in accordance with the degree of the tire diameter difference.

Thus, under the restricted condition that the driver request torque is output until the vehicle speed becomes equal to the starting time limit vehicle speed, the four-wheel drive performance can be displayed by the driver request torque.

Accordingly, at the time of starting of the vehicle where a large front/rear wheel distribution torque is necessary, it is possible to reduce the adverse influence on the drive train owing to the different-diameter tire without damaging the inherent four-wheel drive performance enhancing the starting property.

To achieve the second object of the present invention, a second aspect of the present invention provides a front/rear wheel torque distribution control apparatus of a four-wheel drive vehicle having an electronic control clutch for controlling a torque distribution to front and rear wheels, the front/rear wheel torque distribution control apparatus comprising:
a tire diameter difference degree detector for detecting a degree of a diameter difference when any of front and rear wheels mounts different-diameter tires;
a normal running time detector for detecting a normal running time of the vehicle;
a normal running torque gain determiner for determining a normal running torque gain to be a torque gain smaller than a torque gain at the time when normal-diameter tires are mounted as the degree of the diameter difference detected by the tire diameter difference degree detector is larger, when any of the front and rear wheels mounts the different-diameter tires;
a normal running torque calculator for calculating a normal running torque by multiplying a front/rear wheel rotation speed difference by the torque gain determined by the normal running torque gain determiner; and
a normal running time torque distribution controller for outputting an instruction to obtain the normal running torque calculated by the normal running torque calculator to the electronic control clutch, when the vehicle makes normal running with the different-diameter tires mounted on any of the front and rear wheels thereof.

In the second aspect of the present invention, the tire diameter difference degree detector detects the degree of the diameter difference when any of the front and rear wheels mounts the different-diameter tires. The normal running time detector detects the normal running time of the vehicle. The normal running torque gain determiner determines the normal running torque gain to be the torque gain smaller than the torque gain at the time when the normal-diameter tires are mounted as the degree of the diameter difference detected by the tire diameter difference degree detector is larger, when any of the front and rear wheels mounts the different-diameter tires. The normal running torque calculator calculates the normal running torque by multiplying the front/rear wheel rotation speed difference by the torque gain determined by the normal running torque gain determiner.

The normal running time torque distribution controller outputs the instruction to obtain the calculated normal running torque to the electronic control clutch, when the vehicle makes the normal running with the different-diameter tires mounted on any of the front and rear wheels thereof, and the torque distribution transmitted to the front and rear wheels is controlled.

Specifically, when the torque distribution control corresponding to the front/rear wheel rotation speed difference is performed for the vehicle mounted with the different-diameter tire just in the same manner for the vehicle mounted with the normal-diameter tire, the front/rear wheel distribution torque becomes larger in accordance with an amount of the front/rear wheel rotation speed difference caused due to the different-diameter tire.

Accordingly, when the vehicle makes the normal running with the different-diameter tires mounted thereon, the front/rear wheel distribution torque caused by the front/rear wheel rotation speed difference due to the different-diameter tire is suppressed by switching the torque gain in accordance with the degree of the diameter difference.

With such an operation, by switching the torque gain, it is possible to remove or reduce an influence of an increase in the front/rear wheel distribution torque owing to the different-diameter tire, and hence the front/rear wheel distribution torque becomes close to a torque of a vehicle mounted with normal-diameter tires.

Thus, in the normal running of the vehicle mounted with the different-diameter tires, the minimum four-wheel drive performance can be secured by allowing the front/rear wheel distribution torque to be close to a torque at the time the vehicle mounts the normal-diameter tires.

BRIEF DESCRIPTION OF THE DRAWINGS

FIG. 9 is a diagram showing a starting time limit vehicle speed and a starting time limit torque characteristic determined in accordance with a degree of a diameter difference.

DETAILED DESCRIPTION OF THE PREFERRED EMBODIMENT

Embodiments of the present invention will be described with reference to the accompanying drawings below.

Embodiment 1

Figure 1:
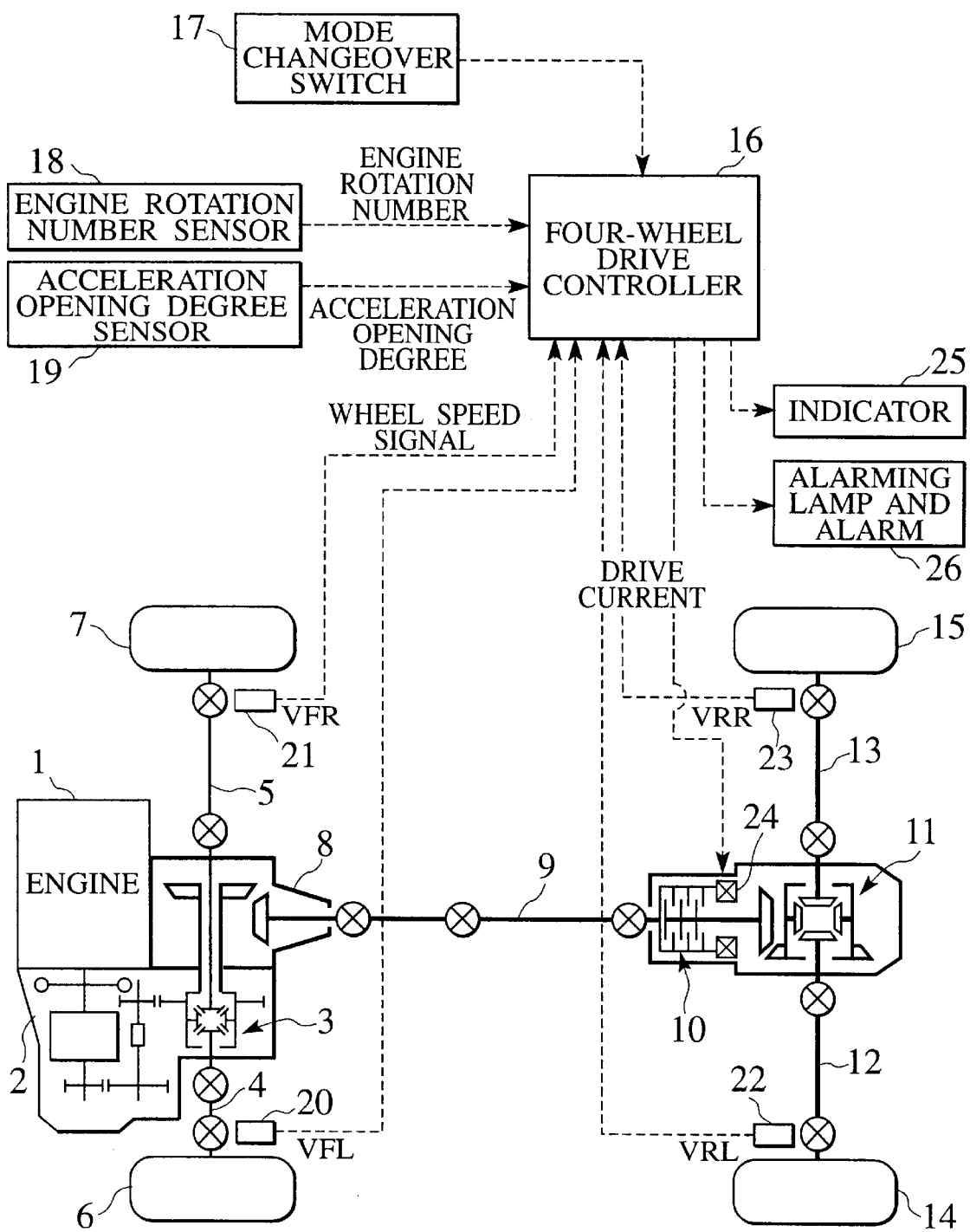
FIG. 1 is a block diagram showing a total system of a front/rear wheel torque distribution control apparatus of a four-wheel drive vehicle in an embodiment 1.

A constitution of a first embodiment will be described. FIG. 1 is a block diagram showing a total system of a front/rear wheel torque distribution control apparatus of a four-wheel drive vehicle in the embodiment 1. Reference numeral 1 denotes an engine; 2, a transmission; 3, a front differential; 4 and 5, a drive shaft of a front wheel; 6 and 7, left and right front wheels; 8, a transfer; 9, a propeller shaft; 10, an electronic control clutch; 11, a rear differential; 12 and 13, a drive shaft of a rear wheel; and 14 and 15, left and right rear wheels.

Specifically, the four-wheel drive vehicle shown in FIG. 1 is constituted based on a FF vehicle (front-engine and front-drive vehicle) in which a drive torque passing through the engine 1 and the transmission 2 is transmitted to the left and right front wheels 6 and 7, and transmits a part of the drive torque to the left and right rear wheels 14 and 15 via the electronic control clutch 10. In terms of a drive force distribution ratio (%), the drive distribution ratio of the front wheel to the rear wheel is 100:0 (%) when the electronic control clutch 10 is in a tightening released state. When the electronic control clutch 10 is in a completely tightening state, the drive force distribution ratio of the front wheel to the rear wheel is 50:50 (%), that is, the drive torque is distributed evenly to the front and rear wheels. The drive distribution ratio for the rear wheel is controlled steplessly at a range of 0% to 50% in accordance with a tightened level of the electronic control clutch 10.

The electronic control clutch 10 is controlled by a drive current from a four-wheel drive controller 16. To the four-wheel drive controller 16, input are a mode switching signal from the mode changeover switch 17, an engine speed signal from an engine speed sensor 18, an acceleration opening degree signal from an acceleration opening degree sensor 19, a left front wheel speed signal from a left front wheel speed sensor 20, a right front wheel speed signal from a right front wheel speed sensor 21, a left rear wheel speed signal from a left rear wheel speed sensor 22 and a right rear wheel speed signal from a right rear wheel speed sensor 23. The drive current is output from the four-wheel drive controller 16 to an electromagnetic solenoid 24 of the electronic control clutch 10, and a display instruction is output to an indicator 25 from the electronic control clutch 10. A lightning alarm instruction is output from the electronic control clutch 10 to an alarming lamp and alarm 26.

Figure 2:
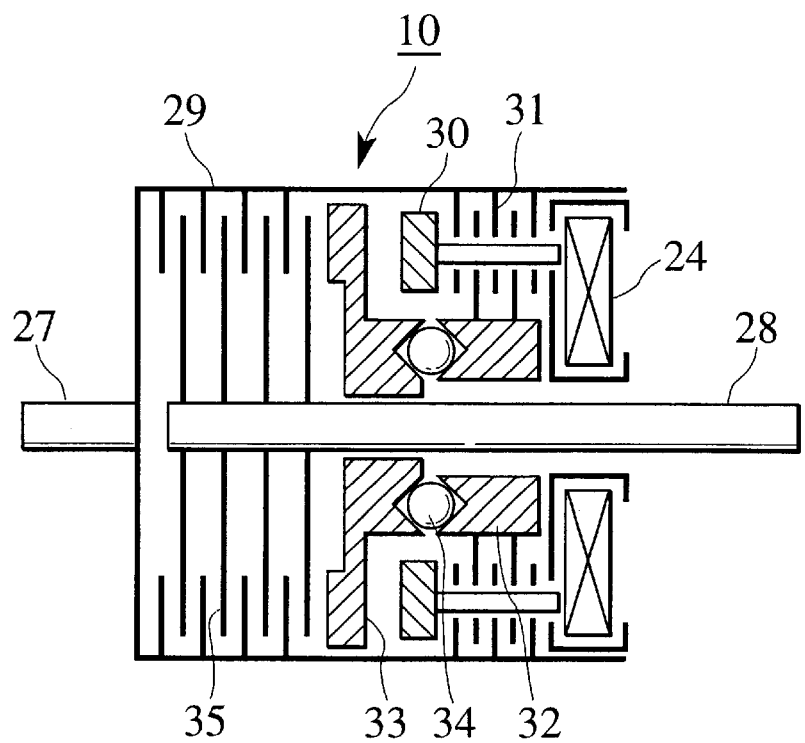
FIG. 2 is a schematic view showing an electronic control clutch used for the front/rear wheel torque distribution control apparatus of the four-wheel vehicle.
Figure 3A:
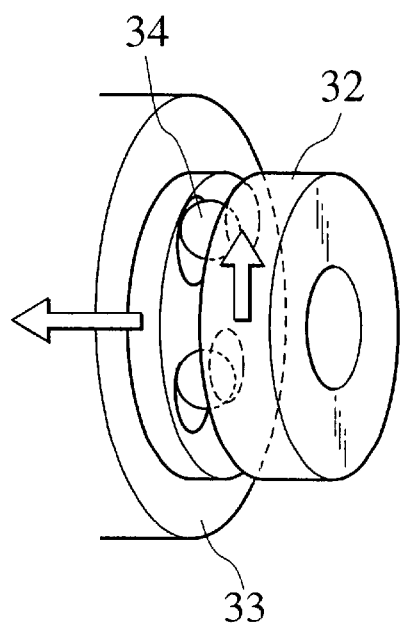
FIGS. 3A is a perspective view showing a cam mechanism of the electronic control clutch used for the front/rear wheel torque distribution control apparatus of the four-wheel vehicle.
Figure 3B:
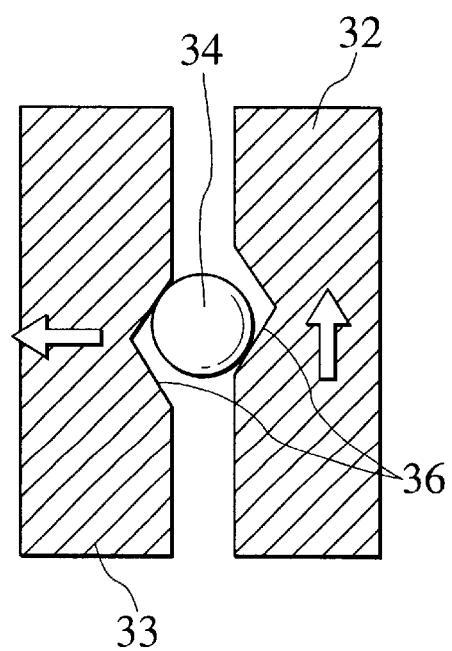
FIG. 3B is an explanatory view for explaining an operation of the cam mechanism of FIG. 3A.

FIG. 2 is a schematic view showing the electronic control clutch 10. FIGS. 3A and 3B are a perspective view showing a cam mechanism of the electronic control clutch 10 and an explanatory view for explaining an operation of the electronic control clutch 10, respectively.

In FIG. 2 and FIGS. 3A and 3B, reference numeral 24 denotes the electromagnetic solenoid; 27, a clutch input shaft; 28, a clutch output shaft; 29, a clutch housing; 30, an armature; 31, a control clutch; 32, a control cam; 33, a main cam; 34, a pole; 35, a main clutch; and 36, a cam groove.

The clutch input shaft 27 has one end coupled to the propeller shaft 9, and has the other end fixed to the clutch housing 29. The clutch output shaft 28 is fixed to an input gear of the rear differential 11.

The control clutch 31 is one located so as to be installed between the clutch housing 29 and the control cam 32, and the main clutch 35 is one located so as to be installed between the clutch housing 29 and the clutch output shaft 28.

The cam mechanism as shown in FIGS. 3A and 3B is constructed by the control cam 32, the main cam 33 and the pole 34 held between the cam grooves 36 and 36 formed in the cams 32 and 33.

Herein, a tightening operation of the electronic control clutch 10 will be described. First, when current is made to flow through the electromagnetic solenoid 24 in response to an instruction from the four-wheel drive controller 16, magnetic field is generated around the electromagnetic solenoid 24, and the armature 30 is allowed to approach to the control clutch 31. The control clutch 31 is pushed by the armature 30 that has approached thereto, so that the control clutch 31 generates a friction torque. The friction torque generated in the control clutch 31 is transmitted to the control cam 32 of the cam mechanism. The torque transmitted to the control cam 32 is amplified/converted to a torque in a shaft direction through the cam grooves 36 and 36 and the pole 34, and this torque pushes the main cam 33 toward the front. The main cam 33 pushes the main clutch 35, thus producing a friction torque in proportion to a current value in the main clutch 35. The torque generated in the main clutch 35 passes through the clutch output shaft 28, and then is transmitted to the rear differential 11 as a drive torque.

Next, an operation will be described.

Figure 4:
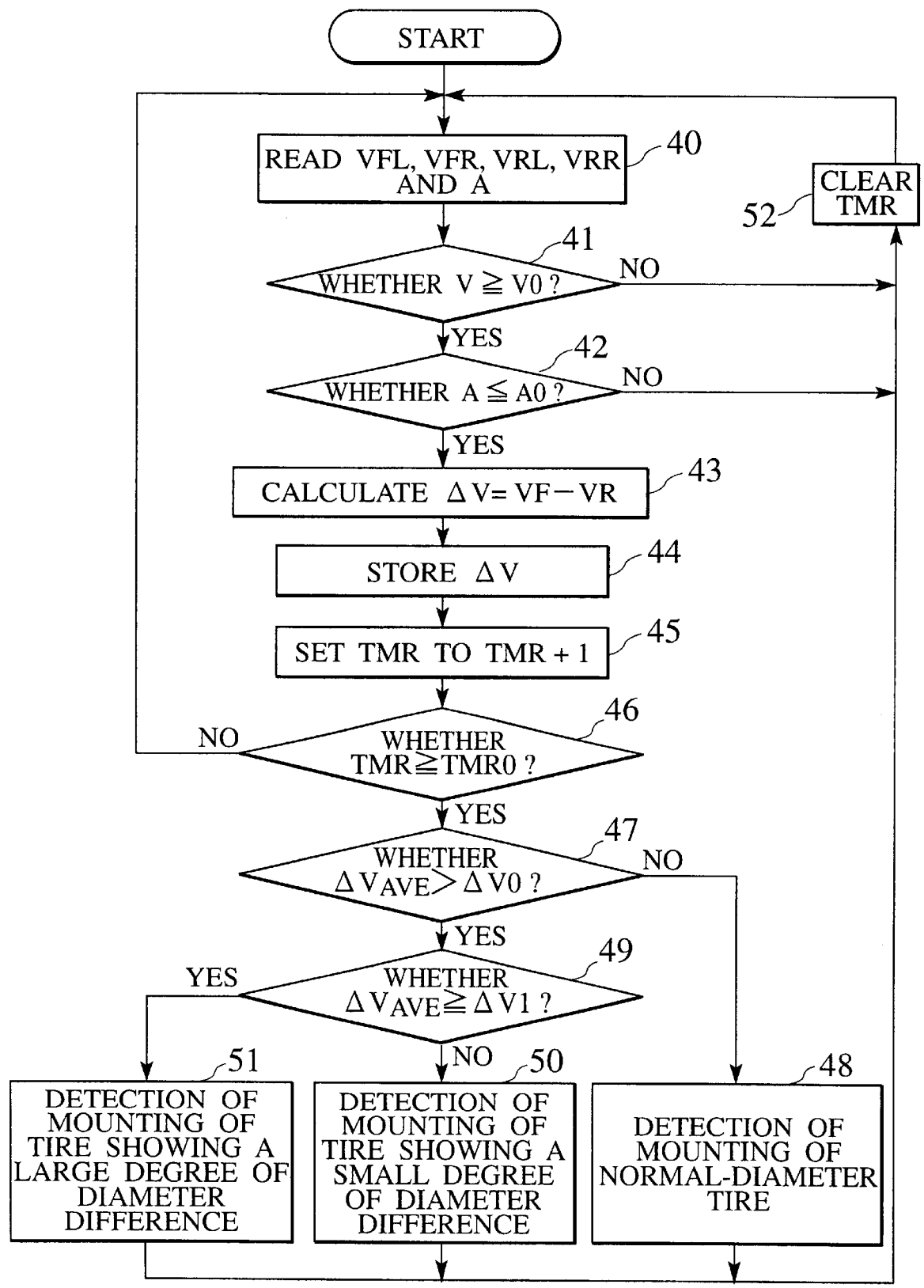
FIG. 4 is a flowchart showing a different-diameter tire detection processing performed by a four-wheel drive controller used for the front/rear wheel torque distribution control apparatus of the four-wheel vehicle.

FIG. 4 is a flowchart showing a flow of a different-diameter tire detection processing executed by the four-wheel drive controller 16, and explanations for each step of the flow are made as follows.

In step 40, read are a left front wheel speed VFL from the left front wheel speed sensor 20, a right front wheel speed VFR from the right front wheel speed sensor 21, a left rear wheel speed VRL from the left rear wheel speed sensor 22, a right rear wheel speed VRR from the right rear wheel speed sensor 23 and a drive current A (a value equivalent to a front/rear wheel distribution torque) output from the four-wheel drive controller 16 to the electromagnetic solenoid 24.

In step 41, it is decided whether the vehicle speed V is equal to a setting vehicle speed V0 or more. If the vehicle speed V is equal to the setting vehicle speed V0 or more, the process advances to step 42, and if the vehicle speed V is not equal to the setting vehicle speed V0 or more, the process advances to step 52. Herein, the vehicle speed V may be obtained from an average value of the left and right rear wheel speeds VRL and VRR. Alternatively, the vehicle speed V may be obtained by use of vehicle speed information from a vehicle speed sensor outside the drawing. Moreover, the setting vehicle speed V0 is set to a vehicle speed value at which a difference of a rotation speed between the front and rear wheels (hereinafter referred to as a front/rear wheel rotation speed difference), which is generated by the different-diameter tire, becomes large and clear.

Figure 5:
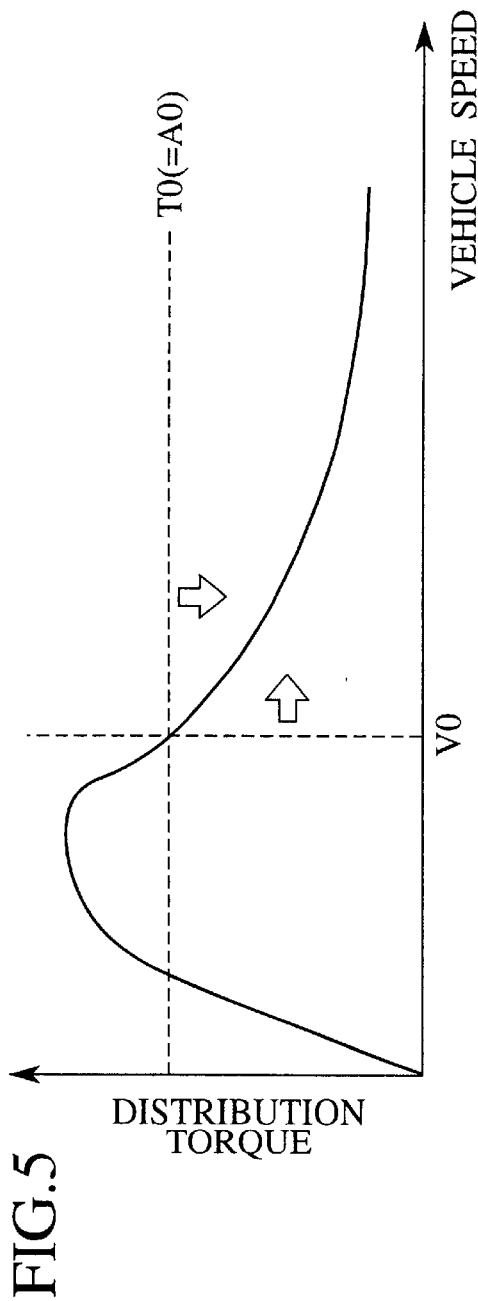
FIG. 5 is a diagram showing a distribution torque characteristic showing a different-diameter tire detection condition, in which a horizontal axis shows a vehicle speed.

In step 42, it is decided whether the drive current A is equal to a setting drive current A0 or less. If the drive current A is equal to the setting drive current A0 or less, the process advances to step 43, and if the drive current A is not equal to the setting drive current A0 or less, the process advances to step 52. Herein, the setting drive current A0 is, as shown in FIG. 5, a drive current value when the distribution torque is T0.

In step 43, when both of vehicle speed conditions in step 41 and drive current conditions in step 42 are established, the difference $\Delta V$ of the rotation speed between the front and read wheels is calculated, and the process advances to step 44. This difference $\Delta V$ of the rotation speed between the front and rear wheels is obtained from a difference between an average value of a front wheel speed $VF(=(VFL+VFR)/2)$ and an average value of a rear wheel speed $VR(=(VRL+VRR)/2)$.

In step 44, the difference $\Delta V$ of the rotation speed between the front and rear wheels, which is obtained by the calculation, is stored in a memory, and the process advances to step 45.

In step 45, a timer value TMR is set to TMR+1, and the process advances to step 46.

Figure 6:
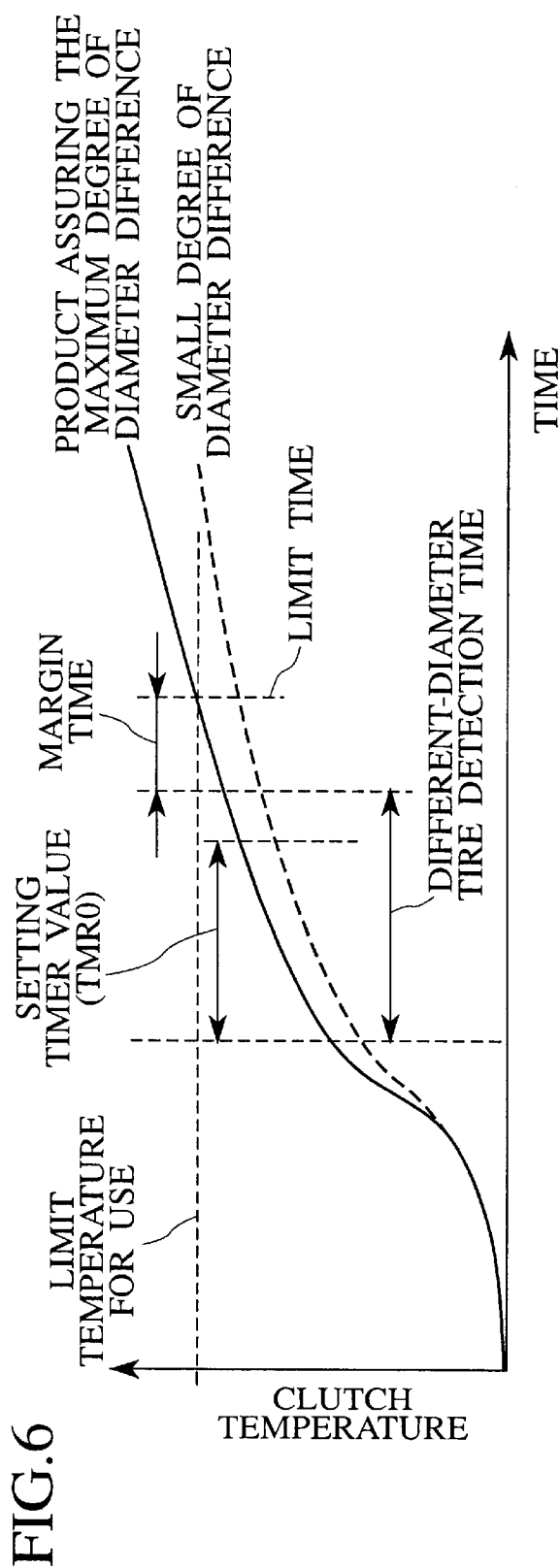
FIG. 6 is a diagram of a clutch temperature characteristic showing a different-diameter tire detection time.

In step 46, it is decided whether the timer value TMR is equal to a setting timer value TMR0 or more. If the timer value TMR is not equal to the setting timer value TMR0 or more, the process returns to step 40, and a processing to increase data concerning the difference of the rotation speed between the front and rear wheels is executed until the timer value TMR becomes equal to the setting timer value TMR0. If the timer value TMR is equal to the setting timer value TMR0 or more, the process advances to step 47. Herein, when a different-diameter tire having the maximum degree of the diameter difference among the degrees of the diameter difference that can be assured is used, the setting timer value TMR0 is set to a time slightly shorter than a diameter difference detection time. As shown in FIG. 6, the diameter difference detection time is obtained by subtracting a margin time from a limit time previously measured, at which a clutch temperature becomes a limit to use the clutch by a tightening torque generated by the difference of the rotation speed between the front and rear wheels.

In step 47, it is decided whether an average value $\Delta VAVE$ of the difference of the rotation speed between the front and rear wheels that is an average value of a plurality of data concerning the difference of the rotation speed between the front and rear wheels stored is equal to a different-diameter tire threshold value $\Delta V0$ or more. If $\Delta VAVE \leq \Delta V0$ is established, the process advances to step 48. At this time, it is decided that the vehicle mounts a normal-diameter tire. On the other hand, if $\Delta VAVE > \Delta V0$ is established, the process advances to step 49, and it is decided that the vehicle mounts a different-diameter tire. Herein, the different-diameter tire threshold value $\Delta V0$ is set to a value of the maximum front/rear wheel rotation speed difference level generated by changes of tire air-pressure.

In step 49, it is decided whether the average value $\Delta VAVE$ of the difference of the rotation speed between the front and rear wheels is equal to a large diameter difference degree threshold value $\Delta V1$ or more. When $\Delta VAVE < \Delta V1$ is established, the process advances to step 50. At this time, it is detected that the vehicle mounts a different-diameter tire showing a small degree of a diameter difference. On the other hand, when $\Delta VAVE \geq \Delta V1$ is established, the process advances to step 51. At this time, it is detected that the vehicle mounts a different-diameter tire showing a large degree of the diameter difference. Herein, the large diameter difference degree threshold value $\Delta V1$ is set to a value of a front/rear wheel rotation speed difference level generated when a difference of a tire diameter between the front and rear wheels is 1 inch in an ordinary car.

In step 52, when the condition either in step 41 or in step 42 is not satisfied, or when any detection of steps 48, 50 and 51 is finished, the timer value TMR is cleared.

Different-diameter Tire Detection Operation

In detecting the different-diameter tire, when the vehicle speed V is equal to the setting vehicle speed V0 or more in step 41, and then when the condition that the drive current A is equal to the setting drive current A0 or less is established in step 42, a front/rear wheel rotation speed difference $\Delta V$ that is detection data of the tire diameter difference is computed in step 43 and then stored in steps 44. The calculation of the front/rear wheel rotation speed difference $\Delta V$ and storing of the data concerning the front/rear wheel rotation speed difference $\Delta V$ are repeatedly executed as long as these two conditions are satisfied. When this data collection time exceeds a time set in step 46, the process advances to step 47, and it is decided what sort of tires including a normal-diameter tire and a different-diameter tire the vehicle mounts. When it is decided that the vehicle mounts the different-diameter tire, the process advances to step 49. In step 49, it is detected based on the detection data concerning the degree of the diameter difference whether the degree of the diameter difference is large or small.

As described above, since the vehicle speed condition that the vehicle speed V is equal to the setting vehicle speed V0 or more is set to one of the different-diameter tire detection conditions, the front/rear wheel rotation speed difference becomes large and clear.

Furthermore, since the drive current condition that the drive current A is equal to the setting drive current A0 or less is set to one of the different-diameter tire detection conditions, the fact that the drive current A is comparatively small, which is equal to a value equivalent to a front/rear wheel distribution torque, can be estimated to be a running state in which occurrence of drive slip between the tire and the road is little, for example, a running state in which the vehicle is running at a constant speed on a high friction road.

Accordingly, the running state in which those two conditions are simultaneously satisfied is used as a detection condition of the different-diameter tire, whereby the front/rear wheel rotation speed difference due to mounting of the different-diameter tire can be accurately detected, and a detection accuracy for a high degree of the tire diameter difference can be obtained.

Furthermore, in detecting the different-diameter tire, it is decided in step 46 whether the timer value TMR is equal to the setting timer value TMR0 or more. When a different-diameter tire showing the maximum degree of the diameter difference among the degrees of the diameter difference that can be assured is used, the setting timer value TMR0 is set to the longest possible time before a limit time. The limit time is previously measured, at which a clutch temperature becomes a limit to use the clutch by a tightening torque generated by the front/rear wheel rotation speed difference. Accordingly, the collection of the data concerning the front/rear wheel rotation speed difference can be performed for a long time until the setting timer value TMR0.

Figure 7:
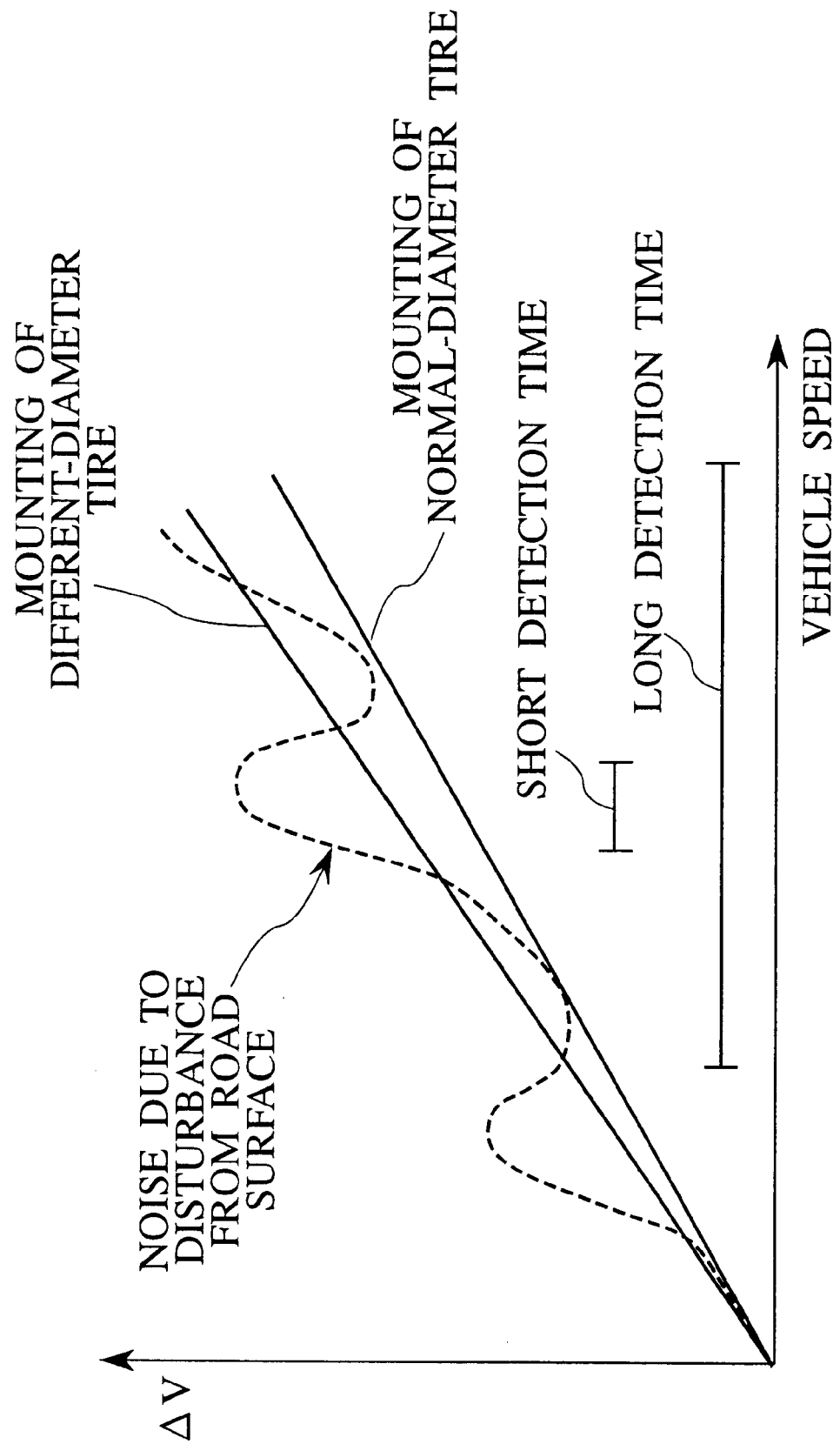
FIG. 7 is a diagram showing a front/rear wheel rotation speed difference characteristic showing noise influence depending on a different-diameter tire detection time.

Therefore, as shown in FIG. 7, the different-diameter tire detection time becomes long, and it is possible to prevent an erroneous detection of the different-diameter tire due to noises from the road surface as in the case where the different-diameter tire detection time is made to be short.

Torque Distribution Control Processing

Figure 8:
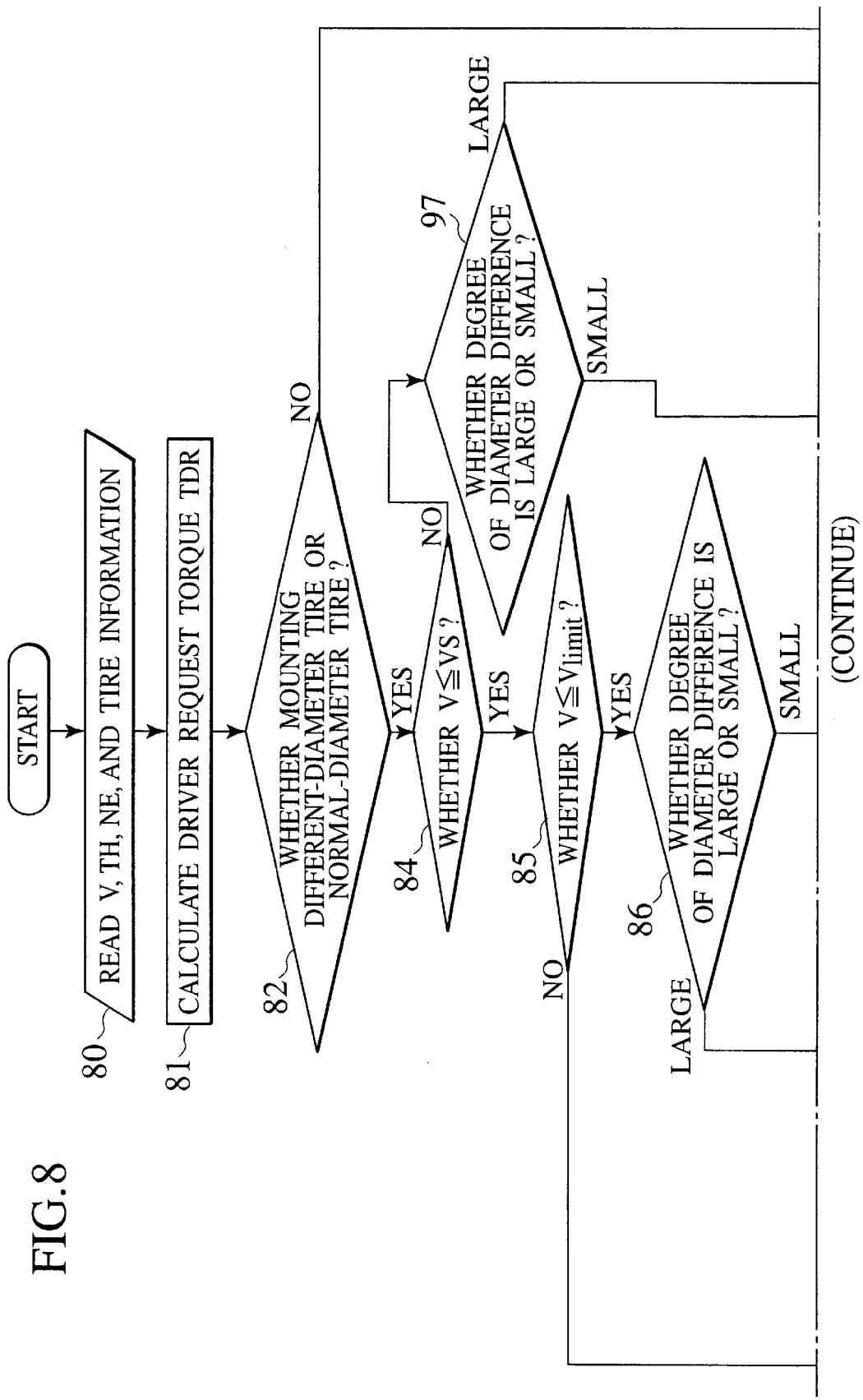
FIG. 8 is a flowchart showing a flow of a front/rear wheel torque distribution control processing executed by a four-wheel drive controller used for the front/rear wheel torque distribution control apparatus of the four-wheel vehicle.

FIG. 8 is a flowchart showing a flow of a torque distribution control processing executed by the four-wheel drive controller 16, and explanations for each step of the flow are made as follows. Note that this processing is executed with 10 msec/routine.

In step 80, read are the vehicle speed V, the acceleration opening degree TH, an engine rotation number NE and tire information.

In step 81, the driver request torque TDR is calculated based on the vehicle speed V, the acceleration opening degree TH and the engine rotation number NE.

In step 82, it is decided whether the vehicle mounts the different-diameter tire or the normal-diameter tire based on tire information. When the vehicle mounts the different-diameter tire, the process advances to the flow from step 84 onward. When the vehicle mounts the normal-diameter tire, the process advances to step 83, and a usual torque distribution control to obtain the distribution torque in accordance with the calculated driver request torque TDR and the front/rear wheel rotation speed difference is performed.

In step 84, it is decided whether the vehicle V is equal to the setting vehicle speed VS or less. When V≦VS is established, the control at the time the vehicle starts is performed from step 85 onward. When V>VS is established, the normal running control from step 97 onward is performed.

In step 85, it is decided whether the vehicle speed V is equal to the starting time limit vehicle speed Vlimit or less. When V≦Vlimit is established, the process advances to the flow from step 86 onward. When V>Vlimit is established, the process advances to step 96.

In step 86, it is decided whether the degree of the diameter difference is large or small based on the tire information. When the degree of the diameter difference is small, the process advances to step 87. When the degree of the diameter difference is large, the process advances to the flow from step 89 onward.

In step 87, the starting time limit vehicle speed Vlimit is determined in accordance with the degree of the diameter difference. Herein, in the case of the small degree of the diameter difference, the starting time limit vehicle speed Vlimit is set to a higher vehicle speed as the degree of the diameter difference is smaller as shown in FIG. 9.

In step 88, an instruction (drive current) to obtain the driver request torque TDR is output to the electromagnetic solenoid 24 of the electronic control clutch 10.

In step 89, the starting time limit torque Tlimit is determined in accordance with the degree of the diameter difference. Herein, in the case of the large degree of the diameter difference, the starting time limit torque Tlimit is set to a lower torque as the degree of the diameter difference is larger as shown in FIG. 9.

In step 90, the starting time limit vehicle speed Vlimit is determined in accordance with the degree of the diameter difference. Herein, in the case of the large degree of the diameter difference, the starting time limit vehicle speed Vlimit is set to a lower vehicle speed as the degree of the diameter difference is larger as shown in FIG. 9.

In step 91, it is decided whether the starting time limit torque Tlimit is equal to the setting torque T0 or less. When Tlimit≦T0 is established, the process advances to step 92, and an alarm lamp is turned on. Then, an instruction to sound an alarm is output. Moreover, when Tlimit>T0 is established, the process advances to step 93, and the alarm lamp is not turned on, and no alarm is not sounded.

In step 94, it is decided whether the staring time limit torque Tlimit is equal to the driver request torque TDR or more. When Tlimit≧TDR is established, the process advances to step 88, and an instruction to obtain the driver request torque TDR is output. When Tlimit<TDR is established, the process advances to step 95, and an instruction to obtain the starting time limit torque Tlimit is output.

In step 96, when it is decided that the vehicle V is more than the starting time limit vehicle speed Vlimit, an instruction to gradually reduce the torque distributed to the rear wheels 14 and 15 in step 88 or step 95 is output.

In step 97, it is decided whether the degree of the diameter difference of the different-diameter tire is large or small based on tire information. If the degree of the diameter difference is small, the process advances to step 98. If the degree of the diameter difference is large, the process advances to step 100.

In step 98, the normal running torque gain K1 is determined based on the small degree of the diameter difference.

In step 99, the normal running torque TND is calculated by multiplying the normal running torque gain K1 by the front/rear wheel rotation speed difference ΔV In step 100, the normal running torque gain K2(K1<K2) is determined based on the large degree of the diameter difference.

In step 101, the normal running torque TND is calculated by multiplying the normal running torque gain K2 by the front/rear wheel rotation speed difference ΔV.

Figure 10:
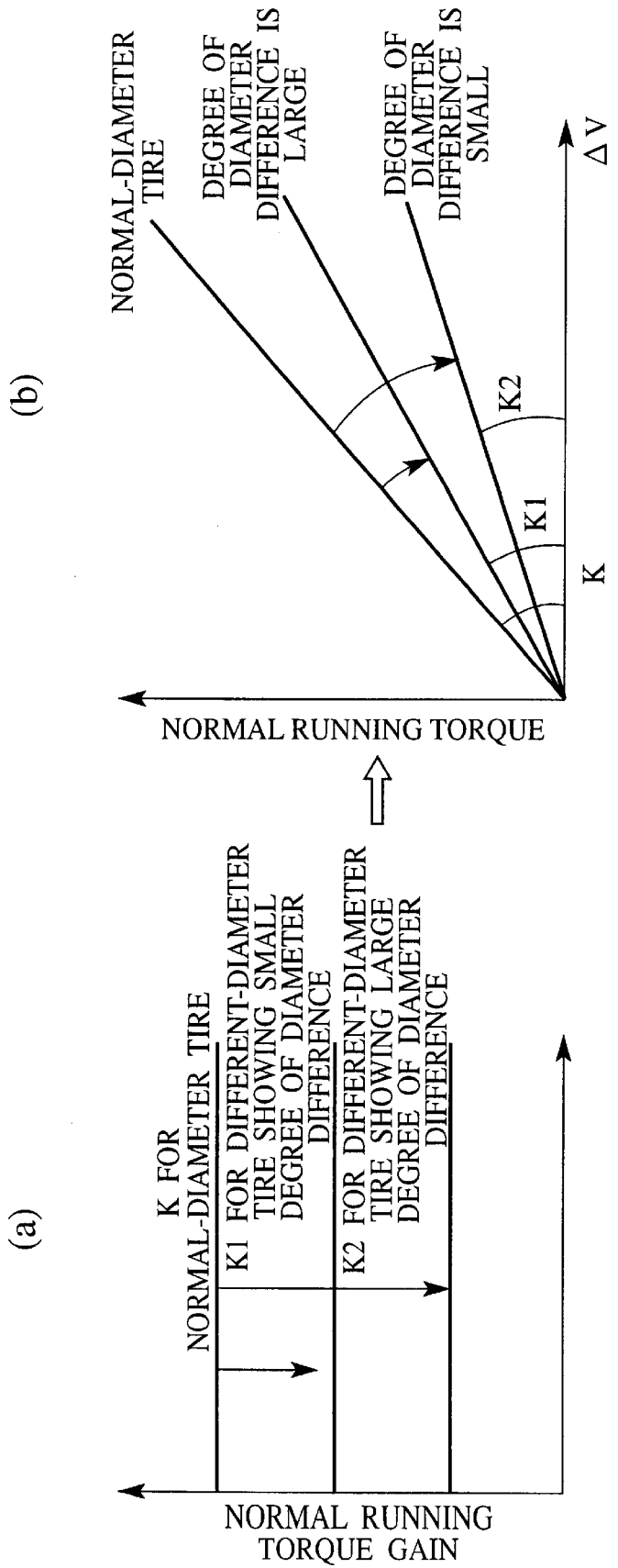
FIG. 10 is (a) a diagram showing a torque gain characteristic when the vehicle makes normal running and (b) a diagram showing a normal running torque characteristic for the front/rear wheel rotation speed difference.

Specifically, as shown in FIG. 10(a), when the normal running torque gain when the vehicle mounts the normal-diameter tire is referred to K, the normal running torque gain is K1(<K) when the degree of the diameter difference is small, and the normal torque gain is K2(<K1<K) when the degree of the diameter difference is large. As shown in FIG. 10(b), the normal running torque TND is calculated by multiplying the normal running torque gain K1 or K2 by the front/rear wheel rotation speed difference ΔV.

In step 102, it is decided whether the normal running torque TND is equal to the driver request torque TDR or more. When TND≧TDR is established, the process advances to step 88, and an instruction to obtain the driver request torque TDR is output. When TND<TDR is established, the process advances to step 103, and an instruction to obtain the normal running torque TND is output.

Control of Vehicle Mounted with the Different-diameter Tire at Starting Time

When the vehicle mounted with the different-diameter tire starts, the process advances in the order of step 80, step 81, step 82, step 84, step 85 and step 86 in the flowchart of FIG. 8. For example, in the case where the vehicle mounts stadless tires in its front wheels, when a small degree of the diameter difference is detected, the process advances from step 86 to step 87, and the starting time limit vehicle speed Vlimit is determined as a value which is closer to a low vehicle speed as the degree of the diameter difference is larger. The process advances to next step 88, and an instruction to obtain the driver request torque TDR is output. The output of the instruction to obtain this driver request torque TDR is executed in step 85 until the vehicle speed V becomes equal to the starting time limit vehicle speed Vlimit determined in step 87. When the vehicle speed V exceeds the starting time limit vehicle speed Vlimit, a distribution torque is gradually reduced.

On the other hand, in the case where the vehicle mounts temper tires in its rear wheels, when a large degree of the diameter difference is detected, the process advances from step 86 to step 89, and the starting time limit torque Tlimit is determined as a value which is closer to a low torque as the degree of the diameter difference is larger. In the next step 90, the staring time limit vehicle speed Vlimit is determined as a lower value as the degree of the diameter difference is large. In step 94, it is decided whether the starting time limit torque Tlimit is equal to the driver request torque TDR or more. When Tlimit≧TDR is established, the process advances to step 88, and an instruction to obtain the driver request torque TDR is output. When Tlimit<TDR is established, the process advances to step 95, and an instruction to obtain the starting time limit torque Tlimit is output. The output to obtain either the driver request torque TDR or the staring time limit torque Tlimit is executed in step 85 until the vehicle speed V becomes equal to the starting time limit vehicle speed Vlimit determined in step 90. When the vehicle speed V exceeds the starting time limit vehicle speed Vlimit, the distribution torque is gradually reduced.

As described above, when the vehicle mounted with the difference-diameter tires starts, the instruction to obtain either the driver request torque TDR or the starting time limit torque Tlimit, which are calculated until the vehicle speed V becomes equal to the starting time limit vehicle speed Vlimit, is output to the electronic control clutch 10, and the torque distribution transmitted to the front and rear wheels is controlled to the four-wheel drive side.

Specifically, at the starting time of the vehicle where the front/rear rotation speed difference occurs due to large drive slip, it is wished that the drive torque is distributed to the four wheels as equally as possible and a high starting property for suppressing a drive slip is obtained.

However, if the torque distribution control is continuously performed without any limitation to time when the vehicle mounts the different-diameter tires similarly to when the vehicle mounts the normal-diameter tires, when the front/rear wheel distribution torque is large and a perfect clutch tightening state is maintained though the vehicle speed increases from the starting state, the front/rear wheel rotation speed difference caused by the different-diameter tire cannot be absorbed by the electronic control clutch, and a large twist torque occurs in the drive train.

Furthermore, when the clutch tightening force is not sufficiently high, the front/rear wheel rotation speed difference caused by the different-diameter tire can be absorbed by the relative rotation of the clutch plate. However, high friction heat is generated because this relative rotation is generated in the state where the clutch tightening force is applied, and deterioration of the clutch due to heat is promoted.

Anyway, as long as the driver does not cope with such a situation by replacing tires with new ones, the drive train including the electronic control clutch is adversely affected.

On the other hand, assuming that the torque distribution to the front and rear wheels be a sufficiently small constant value, when the vehicle mounted with the different-diameter tires starts, the problem that the drive train is adversely affected is removed. However, high starting property of the vehicle utilizing four-wheel drive performance cannot be obtained when the vehicle starts.

Accordingly, in the present invention, the front/rear wheel torque distribution control apparatus is constituted such that the vehicle speed (starting time limit vehicle speed Vlimit) which permits the torque distribution to the front and rear wheels preferentially at the time of starting the vehicle is switched in accordance with the degree of the diameter difference.

Thus, the front/rear wheel torque distribution apparatus of the present invention can display the four-wheel drive performance by the driver request torque TDR or the starting time limit torque Tlimit under the condition that the driver request torque TDR or the starting time limit torque Tlimit is output until the vehicle speed V becomes equal to the starting time limit vehicle speed Vlimit.

Accordingly, at the time of starting the vehicle where a large front/rear wheel distribution torque is necessary, it is possible to reduce the adverse influence on the drive train owing to the different-diameter tire without damaging the inherent four-wheel drive performance enhancing the starting property.

Furthermore, when the vehicle mounted with the different-diameter tire starts, the distribution torque by tightening the electronic control clutch 10 never exceeds the starting time limit torque Tlimit, and the maximum torque is defined as the starting time limit torque Tlimit. Therefore, when the vehicle mounted with the tires showing a large degree of the diameter difference starts rapidly and the driver request torque TDR exceeds the starting time limit torque Tlimit, the adverse influence on the drive train originating from the excessive front/rear wheel distribution torque can be surely prevented.

Control in Normal Running of Vehicle Mounted with Different-diameter Tire

When the vehicle makes the normal running with different-diameter tires, the process advances from step 80 to step 102 through step 81, step 82, step 84, step 97, step 98 (or step 100) and step 99 (or step 101) in the flowchart of FIG. 8. In step 102, it is decided whether the normal running torque TND is equal to the driver request torque TDR or more. If TND≧TDR is established, the process advances to step 88, and an instruction to obtain the driver request torque TDR is output. If TND<TDR is established, the process advances to step 103, and an instruction to obtain the normal running torque TND is output.

Specifically, when the torque distribution control corresponding to the front/rear wheel rotation speed difference is performed for the vehicle mounted with the different-diameter tire just in the same manner for the vehicle mounted with the normal-diameter tire, the front/rear wheel distribution torque becomes larger in accordance with an amount of the front/rear wheel rotation speed difference caused due to the different-diameter tire.

Accordingly, when the vehicle mounted with the different-diameter tires makes the normal running, the front/rear wheel distribution torque caused by the front/rear wheel rotation speed difference due to the different-diameter tire is limited by switching a torque gain according to a degree of a diameter difference.

With such an operation, by switching the torque gain, it is possible to remove or reduce an influence of an increase in the front/rear wheel distribution torque owing to the different-diameter tire, and hence the front/rear wheel distribution torque becomes close to a torque of a vehicle mounted with normal-diameter tires.

Thus, in the normal running of the vehicle mounted with the different-diameter tires, the minimum four-wheel drive performance can be secured by allowing the front/rear wheel distribution torque to be close to a torque at the time the vehicle mounts the normal-diameter tires.

Furthermore, when the vehicle makes the normal running while mounting the different-diameter tires, the driver request torque TDR is selected in case that the normal running torque TND is equal to the driver request torque TDR or more, whereby the distribution torque by tightening the electronic control clutch 10 can be made to be close to the driver request torque TDR as the upper limit target. Thus, it is possible to secure the four-wheel drive performance almost in accordance with the driver request. Four-wheel drive distribution torque characteristic FIG. 11 is a timing chart showing a four-wheel drive distribution torque characteristic of a vehicle mounting the apparatus of the embodiment 1, in which the horizontal axis is the vehicle speed.

Figure 11:
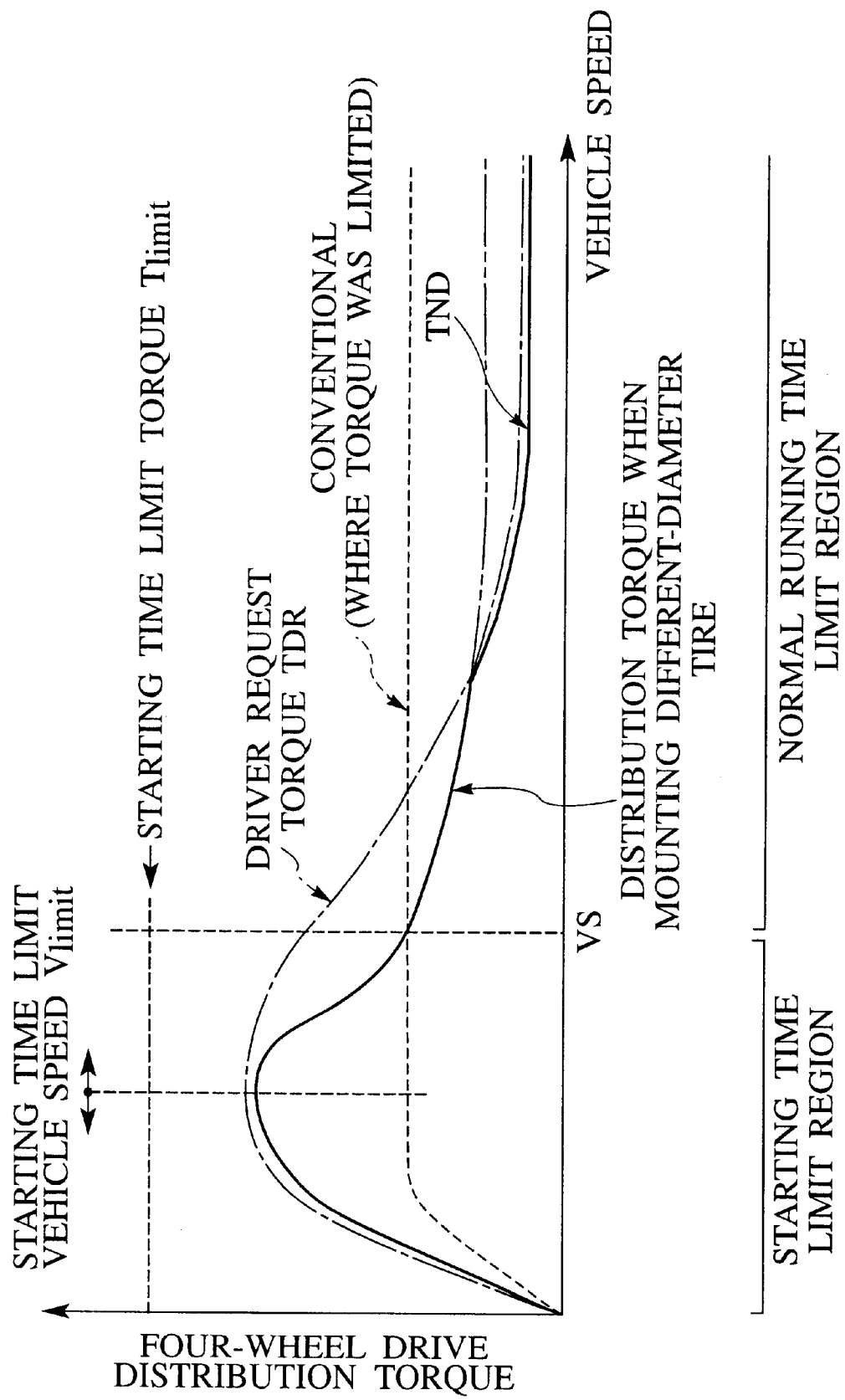
FIG. 11 is a timing chart showing a four-wheel drive distribution torque characteristic in a starting time control region and a normal running time control region.

First, a control to obtain the driver request torque TDR is basically performed in the starting time control region shown in FIG. 11 until the vehicle speed becomes equal to the starting time limit vehicle speed Vlimit. Thus, a higher distribution torque is obtained compared to the prior art in which a small constant torque is given, and it is possible to secure high starting properties by the four-wheel drive performance.

In the region where the vehicle speed exceeds the starting time limit vehicle speed Vlimit, the front/rear wheel torque distribution control apparatus is constituted such that the distribution torque is reduced, whereby adverse influence on the drive train due to continuous application of a high distribution torque can be reduced.

Furthermore, in the normal running control region, as shown in the timing chart of FIG. 11, a control to obtain a small normal running torque TND in which a gain is suppressed basically is performed, whereby a lower distribution torque compared to the prior art giving a small constant torque is brought about and the minimum four-wheel drive performance suppressing the drive slip can be obtained. Note that in the case where the driver request torque TDR is less than the normal running torque TND in the high vehicle speed region, the driver request torque TDR is selected from the viewpoint of securing the minimum four-wheel drive performance.

Another Embodiment

In the embodiment 1, the example of the front/rear wheel torque distribution control apparatus which is based on the front wheel drive was described. The present invention can be applied to a front/rear wheel torque distribution control apparatus which is based on a rear wheel drive and an apparatus which controls a torque distribution to front and rear wheels by providing an electronic control clutch respectively in a front wheel drive system and a rear wheel drive system.

In the embodiment 1, as the electronic control clutch, the examples of the clutch operated by the electromagnetic solenoid and the clutch using the main clutch tightened by the torque amplified through the cam mechanism were shown. However, as is described in Japanese Patent Laid-Open No. 4(1992)-103433, the present invention can be applied also to an apparatus using a multiple plate clutch tightened by controlled oil pressure.

Japanese Patent Application No. 2000-282895, filed on Sep. 19, 2000, is expressly incorporated by reference herein in its entirety.

What is claimed is:

1. A front/rear wheel torque distribution control apparatus of a four-wheel drive vehicle having an electronic control clutch for controlling a torque distribution to front and rear wheels, in which one of the front and rear wheels is a main drive wheel and the other is a subsidiary drive wheel, said front/rear wheel torque distribution control apparatus comprising:

a tire diameter difference degree detector for detecting a degree of a diameter difference between a different-diameter tire and a normal-diameter tire when any of the front and rear wheels mounts the different-diameter tires;

a driver request torque calculator for calculating a driver request torque transmitted from the main drive wheel to the subsidiary drive wheel via said electronic control clutch in response to an operation of a driver;

a vehicle speed detector for detecting a vehicle speed;

a starting time limit speed determiner for making a starting time limit speed in which a torque at the time of starting of the vehicle is limited by a vehicle speed lower as the degree of the diameter difference detected by said tire diameter difference degree detector is larger; and a starting time torque distribution controller for outputting an instruction to obtain the driver request torque calculated by said driver request torque calculator to the electronic control clutch until the vehicle speed becomes equal to a starting time limit vehicle speed determined by said starting time limit vehicle speed determiner when the vehicle mounts the different-diameter tires.

2. The front/rear wheel torque distribution control apparatus according to claim 1, said front/rear wheel torque distribution control apparatus further comprising:

a starting time limit torque determiner for determining a starting time limit torque to be a smaller value as the degree of the tire diameter difference is larger, when the degree of the detected tire diameter difference is larger than a setting value, wherein when the driver request torque exceeds the starting time limit torque, said starting time torque distribution controller outputs an instruction to obtain the starting time limit torque to said electronic control clutch.

3. The front/rear wheel torque distribution control apparatus according to claim 1, said front/rear wheel torque distribution control apparatus further comprising:

a front/rear wheel rotation speed difference detector for detecting a front/rear wheel rotation speed difference; and a front/rear wheel distribution torque corresponding value detector for detecting a front/rear wheel distribution torque corresponding value transmitted via said electronic control clutch, wherein said different-diameter tire detector detects the degree of the diameter difference based on a front/rear wheel rotation speed difference detected, when conditions that the vehicle speed detected by said vehicle speed detector is equal to a setting vehicle speed or more and the front/rear wheel distribution torque corresponding value is equal to a setting value or less are established.

4. The front/rear wheel torque distribution control apparatus according to claim 3, wherein when different-diameter tires of the maximum degree of the diameter difference within an assured range of the degree of the diameter difference are used, said different-diameter tire detector previously measures a time at which a clutch temperature reaches at which a clutch temperature becomes a limit to use the clutch by a tightening torque generated by the front/rear wheel rotation speed difference, and a longest possible time before the clutch temperature becomes the limit is set to a different-diameter tire detection time.

5. A front/rear wheel torque distribution control apparatus of a four-wheel drive vehicle having an electronic control clutch for controlling a torque distribution to front and rear wheels, said front/rear wheel torque distribution control apparatus comprising:

a tire diameter difference degree detector for detecting a degree of a diameter difference when any of front and rear wheels mounts different-diameter tires;

a normal running time detector for detecting a normal running time of the vehicle;

a normal running torque gain determiner for determining a normal running torque gain to be a torque gain smaller than a torque gain at the time when normal-diameter tires are mounted as the degree of the diameter difference detected by the tire diameter difference degree detector is larger, when any of the front and rear wheels mounts the different-diameter tires;

a normal running torque calculator for calculating a normal running torque by multiplying a front/rear wheel rotation speed difference by the torque gain determined by the normal running torque gain determiner; and a normal running time torque distribution controller for outputting an instruction to obtain the normal running torque calculated by said normal running torque calculator to said electronic control clutch, when the vehicle makes normal running with the different-diameter tires mounted on any of the front and rear wheels thereof.

6. The front/rear wheel torque distribution control apparatus according to claim 5, said front/rear wheel torque distribution control apparatus further comprising:

a driver request torque calculator for calculating a driver request torque in accordance with an operation of a driver, the driver request torque being transmitted via said electronic control clutch, wherein when the normal running torque is equal to the driver request torque or more, which is calculated by said driver request calculator, said normal running time torque distribution controller outputs an instruction to obtain the driver request torque to said electronic control clutch, when the normal running torque is not more than the driver request torque, said normal running time torque distribution controller outputs an instruction to obtain the normal running torque to said electronic control clutch.

7. A front/rear wheel torque distribution control apparatus of a four-wheel drive vehicle having an electronic control clutch for controlling a torque distribution to front and rear wheels, in which one of the front and rear wheels is a main drive wheel and the other is a subsidiary drive wheel, said front/rear wheel torque distribution control apparatus comprising:

different diameter degree detection means for detecting a degree of a diameter difference between a different-diameter tire and a normal-diameter tire when any of the front and rear wheels mounts the different-diameter tires;

driver request torque calculation means for calculating a driver request torque transmitted from the main drive wheel to the subsidiary drive wheel via said electronic control clutch in response to an operation of a driver;

vehicle speed detection means for detecting a vehicle speed;

starting time limit speed determination means for making a limit speed in which a torque at the time of starting the vehicle is limited by a vehicle speed lower as the degree of the diameter difference detected by said different diameter degree detection means is larger; and a starting time torque distribution control means for outputting an instruction to obtain the driver request torque calculated by said driver request torque calculation means to the electronic control clutch until the vehicle speed becomes equal to a starting time limit vehicle speed determined by said starting time limit speed determination means when the vehicle mounts the different-diameter tires.

* * * * *